(12) United States Patent
Monteiro (10) Patent No.: US 8,020,355 B2
(45) Date of Patent: Sep. 20, 2011

(54) PROCESS FOR THE MANUFACTURE OF A CROSSBEAM FOR MOTOR VEHICLES AND THE RESPECTIVE CROSSBEAM

(75) Inventor: Rui de Lemos Monteiro, Maia (PT)

(73) Assignee: Sodecia-Centro Technologico, S.A., Maia (PT)

( * ) Notice: Subject to any disclaimer, the term of this patent is extended or adjusted under 35 U.S.C. 154(b) by 321 days.

(21) Appl. No.: 12/134,753

(22) Filed: Jun. 6, 2008

(65) Prior Publication Data
US 2008/0309114 A1 Dec. 18, 2008

(30) Foreign Application Priority Data
Jun. 6, 2007 (PT) .......................................... 103758

(51) Int. Cl.
*B60J 5/04* (2006.01)
(52) U.S. Cl. .................... 52/745.2; 29/897.2; 29/897.35; 29/447; 52/843; 52/834; 52/836; 296/146.6; 296/70
(58) Field of Classification Search .................... 52/831, 52/834–836, 843, 844, 845, 848; 280/752, 280/779, 730.1; 296/203.02, 70, 72, 193.02, 296/146.6; 29/897.2, 897.35, 447
See application file for complete search history.

(56) References Cited

U.S. PATENT DOCUMENTS

| | | | | |
|---|---|---|---|---|
| 4,281,487 A * | 8/1981 | Koller | ........................... | 52/167.1 |
| 5,277,469 A * | 1/1994 | Klippel | ........................ | 296/146.6 |
| 5,787,621 A * | 8/1998 | Leksell | ........................ | 40/607.03 |
| 5,820,202 A * | 10/1998 | Ju | ................................ | 296/146.6 |
| 6,391,470 B1 * | 5/2002 | Schmieder et al. | ........... | 428/598 |
| 6,837,518 B2 * | 1/2005 | Mullan | ......................... | 280/752 |
| 7,048,325 B1 * | 5/2006 | Sandhu | .................... | 296/193.02 |
| 7,407,221 B2 * | 8/2008 | Kring et al. | .............. | 296/193.02 |
| 7,458,625 B2 * | 12/2008 | Kimura et al. | .................. | 296/70 |
| 7,686,334 B2 * | 3/2010 | Schaupensteiner | ........... | 280/752 |
| 2007/0182189 A1 * | 8/2007 | Penner | ........................ | 296/37.12 |
| 2007/0222197 A1 * | 9/2007 | Makita et al. | ................. | 280/752 |
| 2007/0222200 A1 * | 9/2007 | Kukubo | ........................ | 280/779 |

FOREIGN PATENT DOCUMENTS

| | | | |
|---|---|---|---|
| DE | 19845146 A1 | | 4/2000 |
| FR | 2669885 A1 * | | 6/1992 |
| FR | 2895446 A1 | | 3/2005 |
| WO | WO 9407734 A1 * | | 4/1994 |

* cited by examiner

*Primary Examiner* — Brian E. Glessner
*Assistant Examiner* — Beth A. Stephan
(74) *Attorney, Agent, or Firm* — Sughrue Mion, PLLC (57) ABSTRACT

The present invention relates to a process for the manufacture of a crossbeam and the respective crossbeam (1), intended to reinforce the instrument panel of a motor vehicle, guarantee its rigidity and support various devices, the said process being characterised by an alignment between only one main hollow metal body (2) with an elliptical cross-section and one secondary body (3) which is also metal and hollow and has an elliptical or circular cross-section, in that in this alignment the longitudinal axes of the said bodies are coaxial or parallel, in that also in this alignment the contour line of the outer wall of the secondary body is confined by the contour line of the inner wall of the main body, in that prior to this alignment the main body is conformed so as to adapt to the secondary body and in that, in the final phase, the two bodies are connected.

10 Claims, 7 Drawing Sheets

PROCESS FOR THE MANUFACTURE OF A CROSSBEAM FOR MOTOR VEHICLES AND THE RESPECTIVE CROSSBEAM

TECHNICAL FIELD

The present invention relates to a process for the manufacture of a crossbeam and the respective crossbeam, intended to reinforce the instrument panel of a motor vehicle, guarantee its rigidity, bearing in mind the various stresses to which it is subjected, and support the steering column and other devices.

The invention is particularly intended for application in the car industry in general.

PRIOR ART

A crossbeam for a motorised vehicle (cross car beam) is a structure which acts as a support for the instrument panel of a vehicle.

Various solutions exist on the market, from metal solutions to hybrid solutions, the latter being the result of the interfacing of metal structures with polymeric reinforcements.

As far as metal crossbeams are concerned, the market offers two constructive solutions.

One of them is based on the connecting of metal parts, for example tubes and sheets with various configurations, the connection being made by welding, screws, rivets or other means.

The other solution uses die casting to manufacture a single component with the desired configuration.

There are thus various solutions, among them being known both crossbeams constituted by a single tube with a circular cross-section and crossbeams resulting from the connection of various bodies with different cross-sections.

In the case of the latter, there is concern to dimension the crossbeam according to the different stresses to which it is subjected, being particularly significant the part of the crossbeam on which the steering column rests, according to the obstruction which it causes and according to other factors.

Furthermore, the crossbeam must be designed so that when the vehicle is moving, whatever its speed, no undesired vibrations are caused, i.e. vibrations above the limits considered admissible in the car industry, meaning that its natural frequencies are particularly relevant.

In relation to the above, reference is made, by way of example, to the French patent with publication number FR 2859446, the PCT patent with international publication number WO 94/07734 and the German patent with publication number DE 19845146.

In view of the growing dynamism of the car industry, which produces new models at increasingly short time intervals, and bearing in mind the need to carry out various technical studies and tests every time a new crossbeam is produced, which requires investment in specialised human resources and financial resources, it is essential that the manufacturing process be both simple and versatile.

The manufacturing process of the invention is characterised precisely in that it is simple—principally because the crossbeam is constituted exclusively by two bodies—as well as being versatile, thus making it possible to obtain a wide range of crossbeams by means of the same manufacturing process.

These objectives are achieved and thus resolve a number of technical problems which the known solutions are unable to remedy.

In this regard, it can be seen that the process described in the German patent with publication number DE 19845146 is based on the connection of at least two bodies with different cross-sections, the said connection being made using a rigid stabilising element positioned in a certain way.

As mentioned above, the present invention relates to a process for the manufacture of a crossbeam constituted by only two bodies without any stabilising connection element.

The aforementioned German patent also includes the possibility of providing the transition zone between the two bodies with a cover, which is not present in the case of the crossbeam of the present invention.

As stated above, the known processes for the manufacture of crossbeams are not as simple and versatile as the process of the invention, which furthermore makes it possible to obtain, by connecting only two bodies, a wide range of crossbeams as a result of a succession of easily systemised operations, as will be described below in detail.

DESCRIPTION OF THE INVENTION

The present invention relates to a process for the manufacture of a crossbeam intended to reinforce the instrument panel of a motor vehicle, guarantee its rigidity and support various devices, characterised by an alignment between only one main hollow metal body with an elliptical cross-section and one secondary body which is also metal and hollow and has an elliptical or circular cross-section.

Furthermore, the dimensional relationship of these bodies is such as to allow the secondary body to be inserted inside the other body.

The said process is also characterised in that, in a phase prior to alignment, the main body is conformed by pressing, edging or by another method, especially by high pressure, so as to perfectly adapt to the secondary body.

In the final phase, the connection between the two bodies is made, for example by welding.

In addition, the said alignment is made in such a way as to make the longitudinal axes of these bodies coincident, i.e. coaxial or parallel, and to cause the contour line of the outer wall of the secondary body to be confined by the contour line of the inner wall of the main body.

As previously mentioned, the steering column is responsible for the greatest stresses to which the crossbeam is subjected.

The crossbeam of the invention is different from the known crossbeams firstly because the said zone which supports the steering column has an elliptical cross-section which should be orientated according to the direction with the greatest load, thus allowing the moment of inertia to increase in the desired direction in order to offer greater resistance to the load resulting from the stresses to which it will be subjected, without causing an increase in its weight and/or volume.

The crossbeam developed uses components with simple geometry, which can be produced in a particularly economical way by cutting, bending or pressing.

The main body, with an elliptical cross-section, is conformed so as to adapt to the secondary body, and the connection between these two bodies can be made by overlapping them or joining them by their ends, namely by welding along the periphery, which makes it possible to extend the use of the crossbeam of the invention to vehicles with different distances between the A-pillars.

The invention also relates to a crossbeam obtained according to the above-described manufacturing process, characterised in that it has only two bodies: the main body and the secondary body, both of which are metal, hollow and have an elliptical cross-section, the secondary body alternatively having a circular cross-section.

Also, the main body can be obtained by connecting two identical elements.

Furthermore, the possibility of orientating the elliptical section of the main body, as mentioned above, makes it possible to use the crossbeam of the invention in vehicles with the same platform but with different steering column positions.

It should also be noted that the said crossbeam can be attached to the structure of a vehicle using any conventional connection.

In turn, the connection of the steering column, the instrument panel and other devices to the crossbeam can be made using conventional brackets.

As already stated, the process for the manufacture of a crossbeam of the invention is not only simple, namely because the connections can be made using conventional means, but it is also versatile, as the alignments between only the main body and the secondary body make it possible to obtain a multiplicity of different crossbeams, which in practical terms means that a good technical solution can always be obtained for any vehicle using this process.

The versatility also results from the fact that it is possible, during the manufacturing process, to adjust the total length of the crossbeam by altering the length of the overlap between the main and secondary bodies.

The present process was invented with the aim of being simple, which was achieved after in-depth studies.

Thus, it is possible to calculate the performance of any of the crossbeams of the invention by using common calculation tools, for which purpose it is simply necessary to determine a set of parameters, for example the length of the crossbeam, the length of the main and secondary bodies, and the relative position of the longitudinal axes of these bodies.

It is also important to mention that the process in question, being simple, namely because it uses simple bodies, enables a given crossbeam, for example a crossbeam incorporating a secondary body with a circular cross-section, to be applied to different vehicles with an adequate performance in each of them, which means that the vibrations remain within the limits considered to be admissible in the car industry.

For this purpose, it is simply necessary, respecting the previous calculations, to orientate the elliptical cross-section of the main body at the stage of the assembly of the crossbeam in such vehicles.

Since the crossbeam is constituted by only two bodies, both of which are readily available on the market, it further ensues from the above that for the production of the crossbeam of the invention, there is no need for large stocks, which is an additional advantage in relation to the known crossbeams.

DESCRIPTION OF THE FIGURES

In the figures attached hereto, which are presented by way of example and have no restrictive character, it is possible to observe the following.

Figure 1:
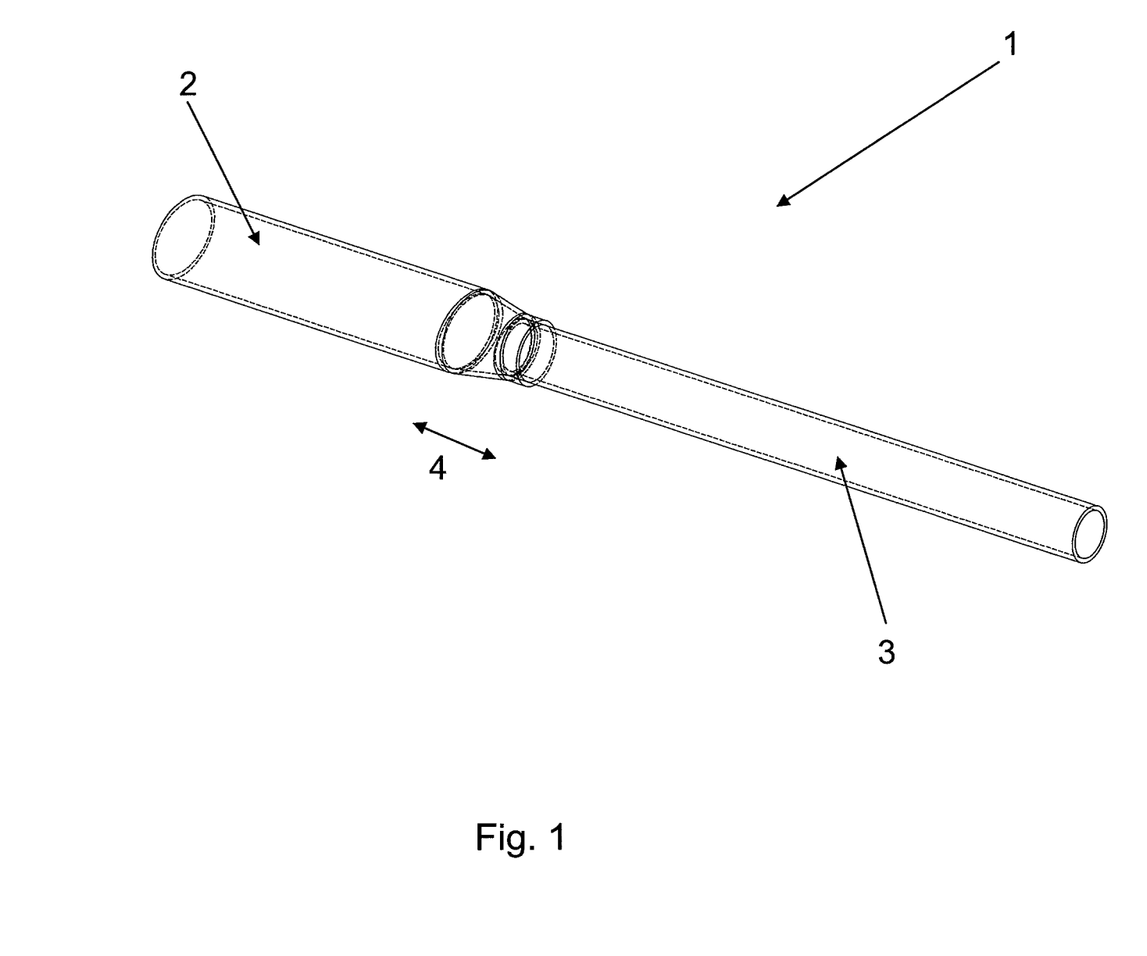
FIG. 1 shows a perspective view of a crossbeam obtained using the manufacturing process of the invention, having a main body with an elliptical cross-section and a secondary body with a circular cross-section, the longitudinal axes of the said bodies being coaxial, this figure also showing the conformation zone of the main body.
Figure 2:
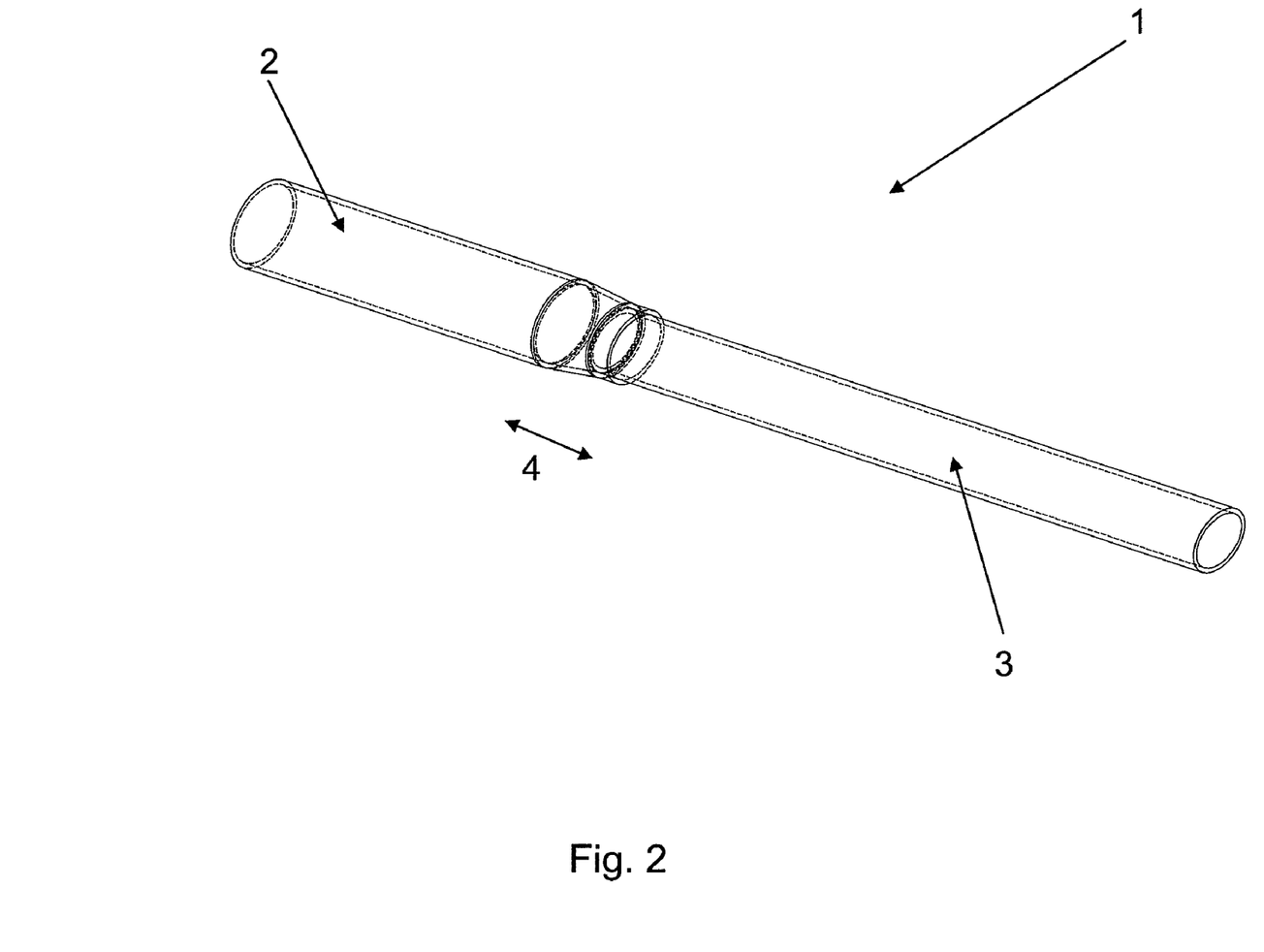
FIG. 2 shows a perspective view of a crossbeam obtained using the manufacturing process of the invention, having a main body and a secondary body, both with an elliptical cross-section, the longitudinal axes of the said bodies being coaxial, this figure also showing the conformation zone of the main body.
Figure 3:
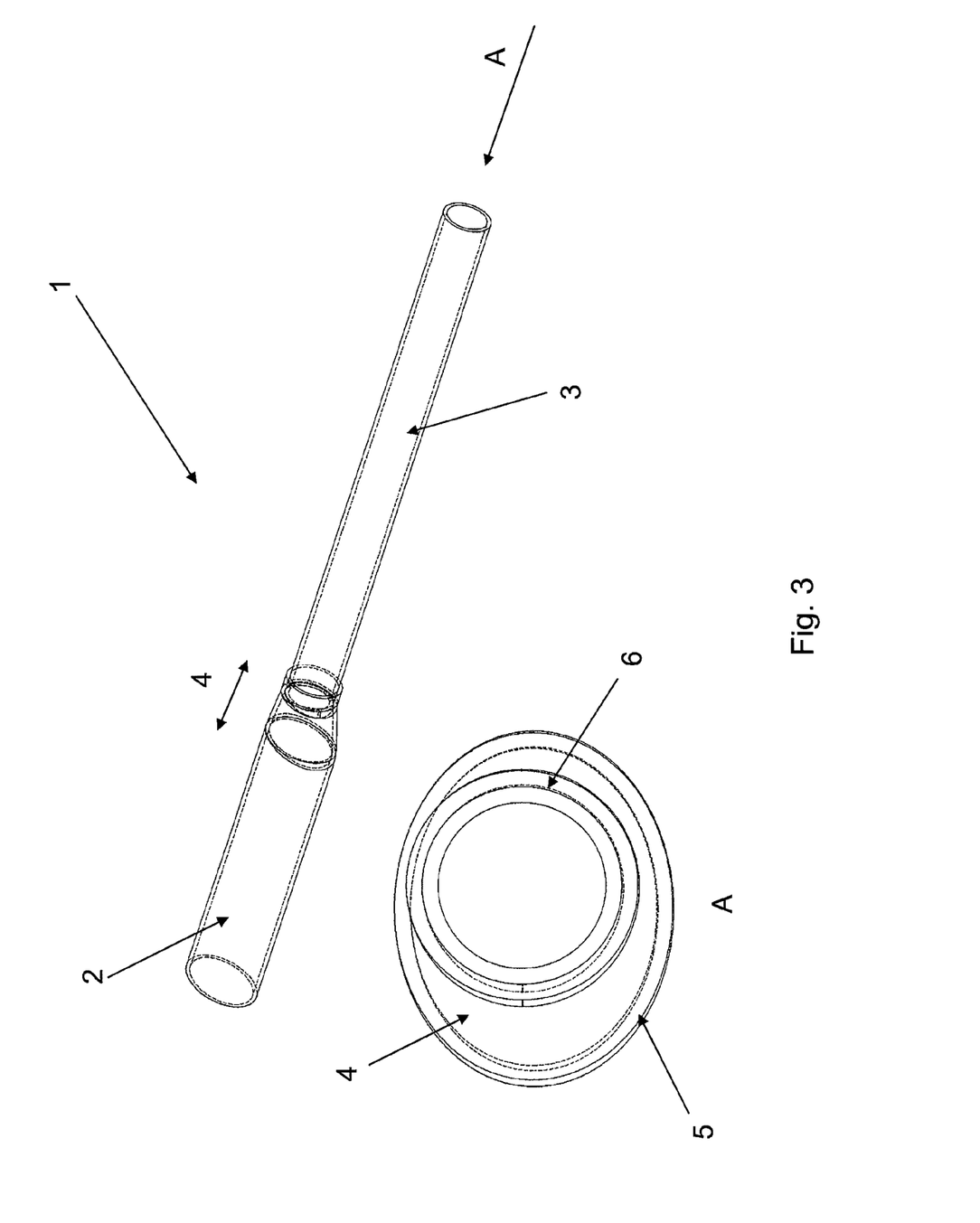
FIG. 3 shows a perspective view of a crossbeam obtained using the manufacturing process of the invention, having a main body with an elliptical cross-section and a secondary body with a circular cross-section, the longitudinal axes of the said bodies being parallel, this figure also showing the conformation zone of the main body. This figure further shows view A of the crossbeam, marking the contour lines of the inner wall of the main body and of the outer wall of the secondary body.
Figure 4:
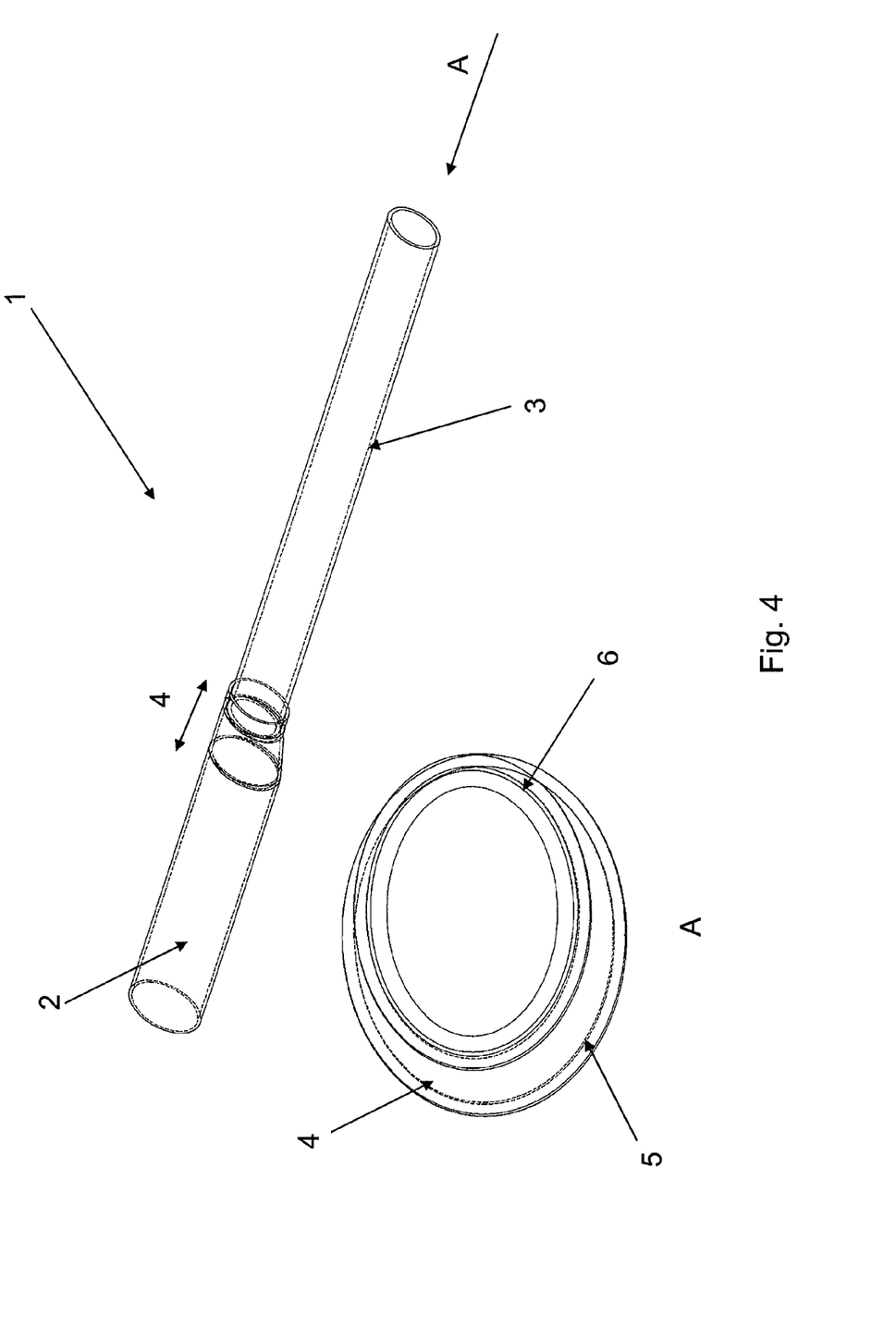
FIG. 4 shows a perspective view of a crossbeam obtained using the manufacturing process of the invention, having a main body and a secondary body, both with an elliptical cross-section, the longitudinal axes of the said bodies being parallel, the main and secondary symmetry axes of the elliptical sections in question also being parallel, and this figure also showing the conformation zone of the main body. This figure further shows view A of the crossbeam, marking the contour lines of the inner wall of the main body and of the outer wall of the secondary body.
Figure 5:
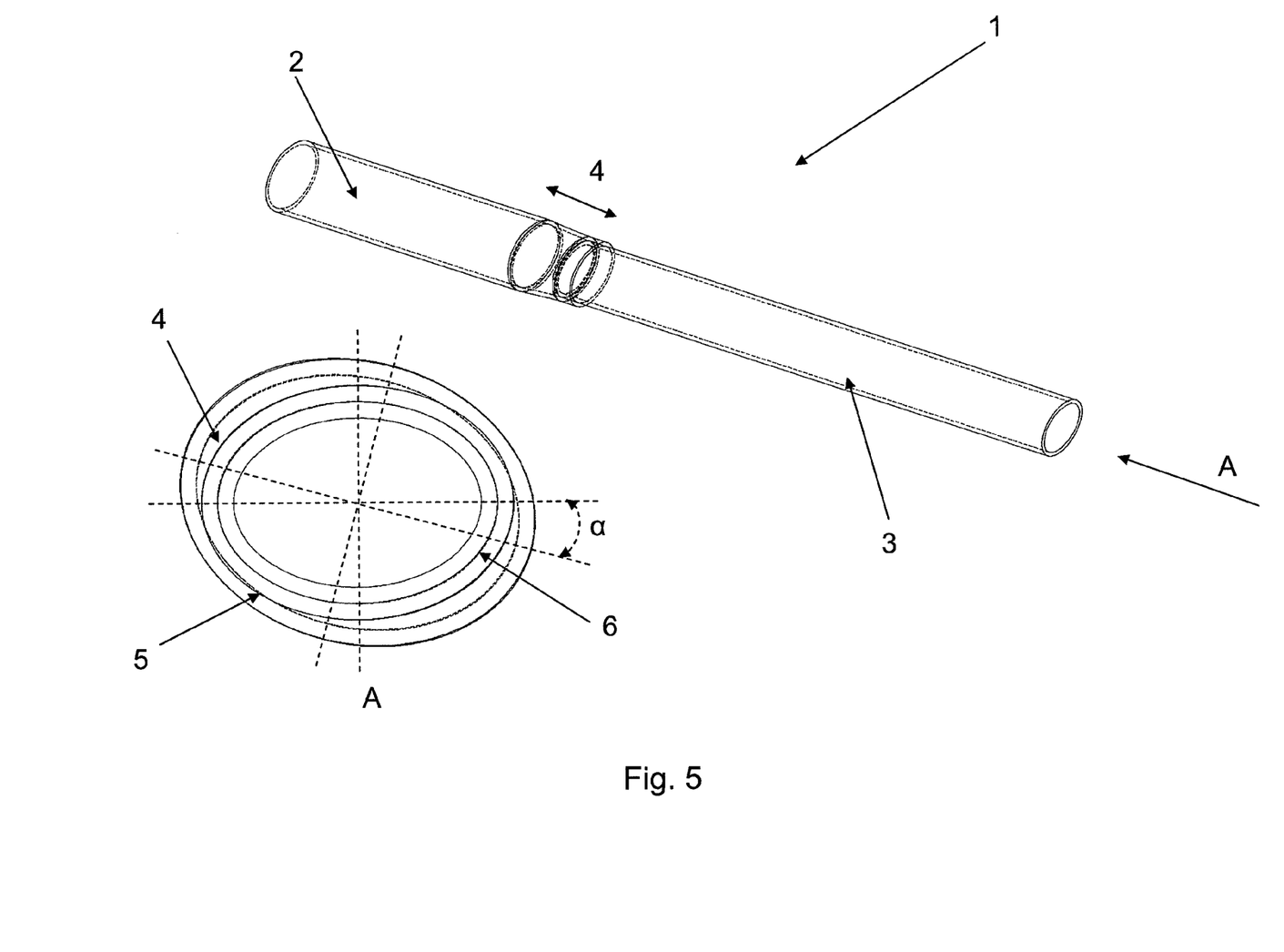
FIG. 5 shows a perspective view of a crossbeam obtained using the manufacturing process of the invention, having a main body and a secondary body, both with an elliptical cross-section, the longitudinal axes of the said bodies being coaxial, but the main and secondary symmetry axes of the elliptical sections in question not being parallel and forming an α angle between them, this figure also showing the conformation zone of the main body. This figure further shows view A of the crossbeam, marking the contour lines of the inner wall of the main body and of the outer wall of the secondary body.
Figure 6:
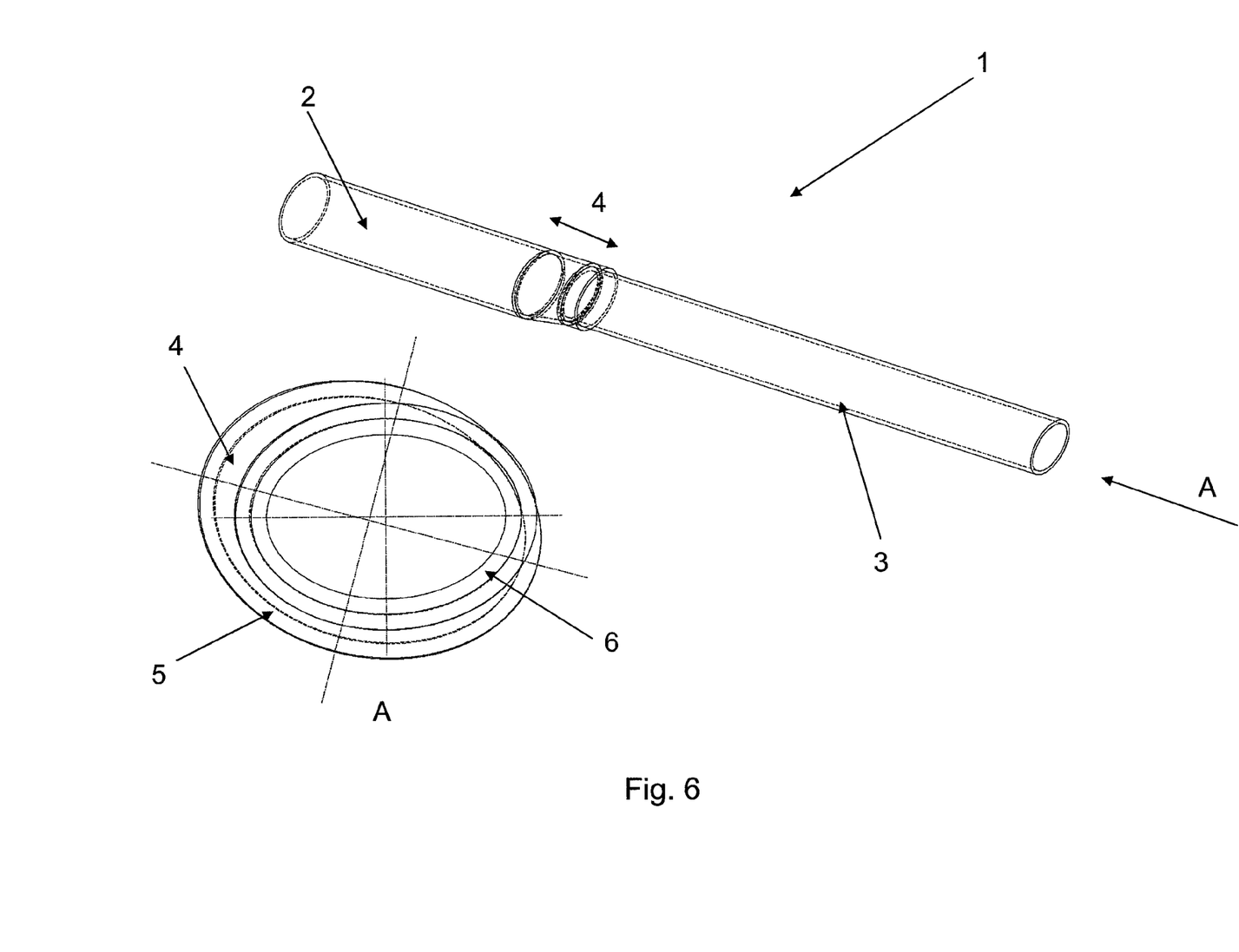
FIG. 6 shows a perspective view of a crossbeam obtained using the manufacturing process of the invention, having a main body and a secondary body, both with an elliptical cross-section, the longitudinal axes of the said bodies being parallel, but the main and secondary symmetry axes of the elliptical sections in question not being parallel, this figure also showing the conformation zone of the main body. This figure further shows view A of the crossbeam, marking the contour lines of the inner wall of the main body and of the outer wall of the secondary body.
Figure 7:
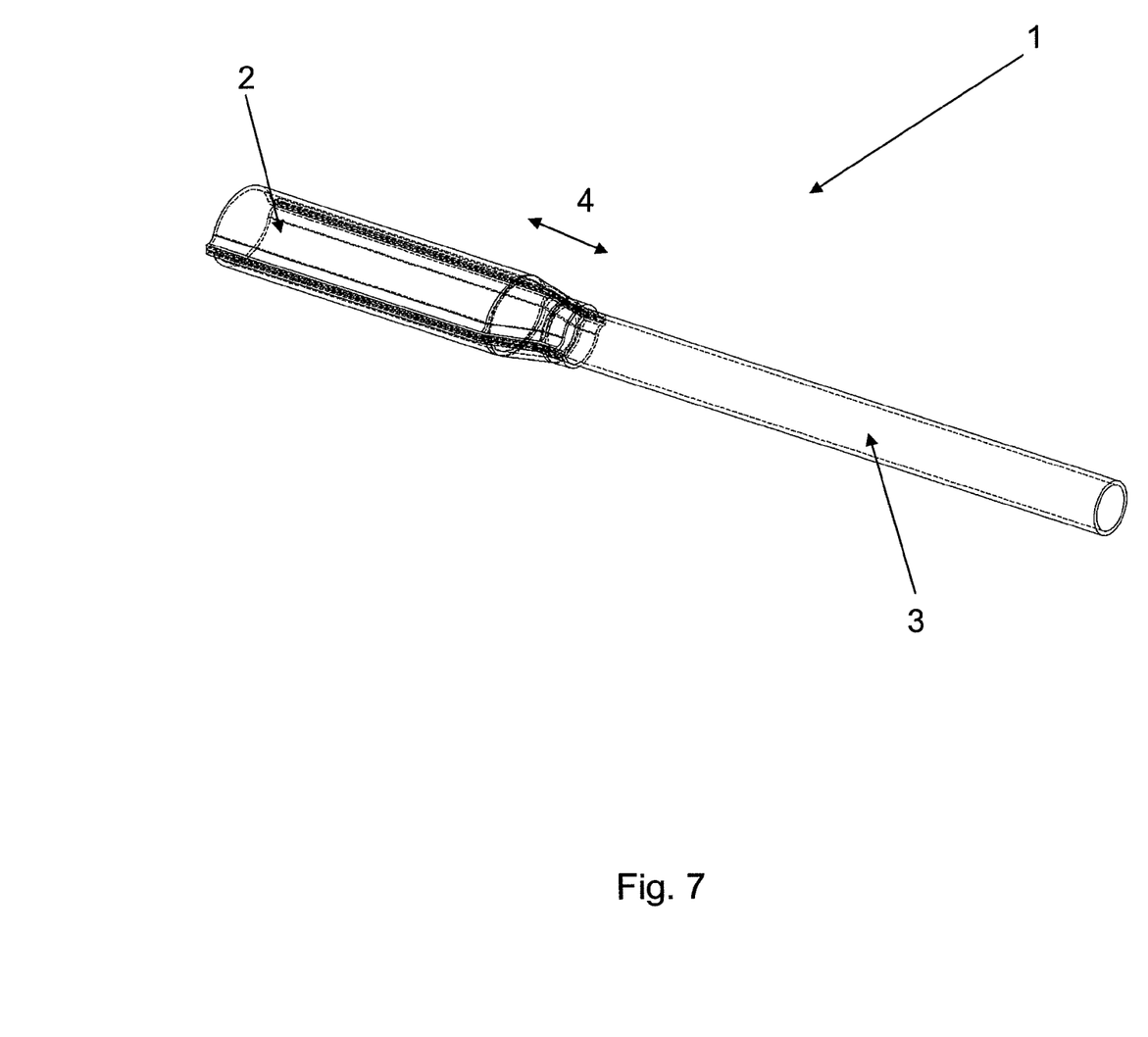
FIG. 7 shows a perspective view of a crossbeam wherein the main body results from the connection of two identical elements, this view being identical in all other ways to that of FIG. 1.

In particular, the abovementioned figures show:
1—Crossbeam
2—Main body of the crossbeam
3—Secondary body of the crossbeam
4—Conformation zone of the main body
5—Contour line of the inner wall of the main body
6—Contour line of the outer wall of the secondary body

The invention claimed is:

1. A process for the manufacture of a reinforcement crossbeam (1) for the instrument panel of a motor vehicle, that guarantees rigidity and provides support for various devices, comprising:
  inserting into one main hollow metal body (2) with an elliptical cross-section a secondary body (3) which is also metal and hollow and has one of an elliptical or circular cross-section,
  aligning longitudinal axes of the main and secondary bodies to be coaxial or parallel,
  aligning a contour line of an outer wall (6) of the secondary body (3) so that said contour line is aligned with a contour line of an inner wall (5) of the main body (2),
  conforming the main body (2) so as to adapt to the secondary body (3) whereby only a single continuous portion of the contour line of the inner wall (5) of the main body (2) is in contact with a single continuous portion of the contour line of the outer wall (6) of the secondary body (3) and a remaining portion of each said contour lines of said main and secondary bodies are not in contact, and connecting the main body and the secondary body.

2. The process for the manufacture of a crossbeam (1) according to claim 1, wherein, in the connecting step, the connection between the two bodies is made by overlapping.

3. A cross beam obtained according to the manufacturing process of claim 1, the cross-beam having only one main body and a secondary body, each of the main body and the secondary body having one of an elliptical or circular cross section.

4. The crossbeam (1) as recited in claim 3, characterised in that it has only one main body (2) with an elliptical cross-section and one secondary body (3) with a circular cross-section, the said bodies having coaxial longitudinal axes.

5. The crossbeam (1) as recited in claim 3, characterised in that it has only one main body (2) and one secondary body (3), both with an elliptical cross-section, the said bodies having coaxial longitudinal axes.

6. The crossbeam (1) as recited in claim 3, characterised in that it has only one main body (2) with an elliptical cross-section and one secondary body (3) with a circular cross-section, the said bodies having parallel longitudinal axes.

7. The crossbeam (1) as recited in claim 3, characterised in that it has only one main body (2) and one secondary body (3), both with an elliptical cross-section, the said bodies having parallel longitudinal axes, the main and secondary symmetry axes of the elliptical sections in question also being parallel.

8. The crossbeam (1) as recited in claim 3, characterised in that it has only one main body (2) and one secondary body (3), both with an elliptical cross-section, the said bodies having coaxial longitudinal axes, but the main and secondary symmetry axes of the elliptical sections in question not being parallel and forming an angle between them.

9. The crossbeam (1) as recited in claim 3, characterised in that it has only one main body (2) and one secondary body (3), both with an elliptical cross-section, the said bodies having parallel longitudinal axes, but the main and secondary symmetry axes of the elliptical sections in question not being parallel.

10. The crossbeam (1) as recited in claim 3, characterised in that it has only one main hollow metal body (2) with an elliptical cross-section and one secondary body (3), which is also metal and hollow and has an elliptical or circular cross-section, and in that the dimensional relationship of these bodies is such as to allow the secondary body to be inserted inside the main body.

* * * * *